Figure 1:
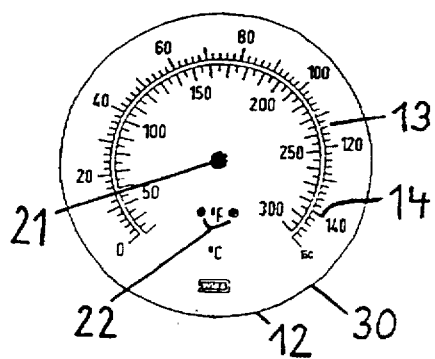

United States Patent [19]
Schneider et al.

[11] Patent Number: 5,893,322
[45] Date of Patent: Apr. 13, 1999

[54] METHOD AND APPARATUS FOR PRODUCTION OF A DIAL

[76] Inventors: Alfred Schneider, Buchenstrasse 9, 63924 Kleinheubach; Klaus Schäfer, Odenwaldstrasse 8, 64732 Bad König, both of Germany

[21] Appl. No.: 08/803,570

[22] Filed: Feb. 19, 1997

[30] Foreign Application Priority Data

Feb. 19, 1996 [DE] Germany .................... 196 06 069

[51] Int. Cl.$^6$ ...................................... B31C 1/06
[52] U.S. Cl. ................................ 101/34; 101/33
[58] Field of Search .................... 101/35, 33, 34; 116/286

[56] References Cited

U.S. PATENT DOCUMENTS 4,066,802  1/1978  Clemens .

FOREIGN PATENT DOCUMENTS 3425576   1/1986   Germany .
3917156   10/1990  Germany .
41 18 922 12/1992  Germany .
44 08 927 9/1995   Germany .

*Primary Examiner*—Edgar Burr
*Assistant Examiner*—Charles H. Nolan, Jr.
*Attorney, Agent, or Firm*—Roth & Goldman

[57] ABSTRACT

A process and a device are described for production of a dial by imprinting a blank with an imprint which enable cost-effective production in very high quality even with small quantities. Data entered via an input device 110 are delivered to a data management device 120, which positions the dial pattern on a printing master defined by the data entered. If a pattern is not stored in memory, a new pattern is requested from a design device 130 and delivered to the data management device 120, which enters the printing master into an output device 140. The output device 140 generates the printing master according to drawing data and outputs it to a printer 200 which creates a prefixed toner image 11 on a carrier sheet 10. The blank 20 to be imprinted and the carrier sheet 10 with the toner image 11 mirror-inverted to the imprint are introduced into a press 300 and the blank 20 is aligned in a predefined position and the carrier sheet 10 is aligned in a predefined position corresponding to the position of the blank 20. By softening the toner image 11 and pressing the toner image 11 onto the blank 20, the toner image 11 is transferred from the carrier sheet 10 to the blank 20 and forms, together with the blank 20, a dial 30 provided with the imprint. Then, the carrier sheet 10 may be removed from the transferred toner image and the dial 30 removed from the press 300. The press 300 may be designed as a flat press, a roller press, or a combination of the two.

26 Claims, 12 Drawing Sheets

300b

300c

METHOD AND APPARATUS FOR PRODUCTION OF A DIAL

The invention relates to a process and device for production of a dial by printing a face on a blank.

It is general practice to provide dials with an imprint using offset printing. In this process, at least one printing block is produced with which a blank, made, for example, of a thin sheet, is imprinted. Since the outlay for the production of the printing block and, in particular, a plurality of printing blocks which are necessary for multicolored printing is high, this process is suitable for the production of large runs, but not economical for the production of dials with different designs in small runs.

From U.S. Pat. No. 5,170,549 issused Dec. 15, 1992, a process for production of a meter for measuring pressure and temperature is known. In it, the scale is written on the dial by a laser printing device. In particular, this known process enables scaling the meter to the actual amplitude of pointer movement. In principle, using the laser printing process, dials may only be imprinted singly. This also demands a relatively high outlay of time, which has previously prevented efficient, cost-effective production of both standard dials in large quantities and single dials with a variable design. In addition, narrow limits are set on the graphic design of the dial by the use of a laser printing device since in practice the dial can be imprinted in only a single color.

Dials may also be produced by the imprinting of blanks using a plotter. In this process, the imprint with which the blank is to be provided is defined using a data processing device connected to the plotter. Using the plotter the imprint is applied on the blank with ink. Despite relatively time-consuming production, this process is suitable for economical production of dials in small quantities, but the resistance of the dials produced to external influences is low. Moreover, the resolution of a plotter is not especially high, and multicolored imprinting using a plotter is laborious.

No known process for production of dials, such as offset printing, inscribing with a laser printing device or with a plotter, is uniformly satisfactory with regard to quality of the dial, production time, and cost. In particular, with quantities of a few hundred to a few thousand dials, the above-described processes enable no economical production of dials. Production of dials in large quantities using offset printing is, to be sure, relatively cost-effective but offers inadequate flexibility for design and modification of the imprint.

Consequently, the object of the invention is to provide a process and a device for the production of dials which are simple and cost-effective and whose print quality, based on resolution and color as well as speed, are 15 and 16 significantly improved compared to prior art processes.

With regard to the process, the object is accomplished with the characteristics of claim 1; and with regard to the device, with the characteristics of claim 14.

According to the invention, a process for production of a dial in which a blank is provided with an imprint is provided. First, a prefixed toner image which is the mirror image of the imprint is produced on a carrier sheet. The blank to be imprinted is introduced into a press and aligned in a predefined position. For the application of the toner image to the blank, the carrier sheet is introduced into the press and the toner image is aligned in a position which corresponds to the predefined position of the blank. Then, the aligned toner image is softened and pressed onto the blank, whereby the toner image is transferred to the blank to form the imprint. Finally, the carrier sheet is peeled off the transferred toner image and the dial is removed from the press.

With this process, it is possible to produce high quality dials whose resolution can be as much as $6 \times 10^{-5}$ m. Since the transferred toner of which the toner image consists is usually resistant to external influences, the finished printed dials have high resistance to ultraviolet radiation and filling liquids, with which meters may, for example, be filled to attenuate pointer movement. Production time can be significantly reduced compared to prior art processes since only a few minutes are necessary to perform the process, such that by comparison with conventional processes there are also lower costs for the production of such a dial. Since it is also possible to use blanks made of simple sheets as the starting material, production costs per dial may be lowered further. Since the creation of the toner image on the carrier sheet is relatively simple using known printers and copiers, even small lots may be produced economically, since, for example, in contrast to offset printing, the production of printing blocks is eliminated. It is unnecessary to deal with liquid dyes and solutions since all colors are transferred in one printing. Consequently, multicolored printing is significantly simpler and environmentally safer; in addition, there is essentially only paper or film waste from the peeled-off carrier sheet.

The device according to the invention for the production of a dial by imprinting a blank with an imprint has a pressure device for the creation of a mirror-inverted, prefixed toner image on a carrier sheet for the imprint, an alignment arrangement to align the blank in a predefined position and the toner image in a predefined position relative to the blank, and a pressure device to exert a force in a direction perpendicular to the plane of the carrier sheet and the blank and to press the toner image onto the blank.

The dial produced using the device according to the invention is suitable for all types of meters with analog measuring scales. In particular, with temperature and especially with pressure meters, its use is appropriate if average quantities between a few hundred and a few thousand dials are to be produced.

Also German patent DE-41 18 922 C2 discloses a process for transferring motifs from an original master onto a carrier using an intermediate carrier with simultaneous use of heat and pressure for a specific period of time. In a first step, a print image is copied by means of a laser copier from a sheet of paper as an original master onto a film as an intermediate carrier, whereby a toner image is created through the application of toner to the intermediate carrier. In a subsequent second step, the toner is transferred from a film as an intermediate carrier to a piece of stiff cardboard at a specific temperature and a specific pressure by means of a transfer arrangement. The transfer arrangement has a heating plate and a pressure plate which is hydraulically movable relative to the heating plate. This prior art process has, to date, been used only to print on packaging and textiles.

Moreover, with this prior art process, no measures at all are taken for securing the carrier and the intermediate carrier in the transfer arrangement, such that slippage of the intermediate carrier relative to the carrier during the transfer of the toner image to the carrier cannot be prevented. Thus, reliable transfer of the motif from the original master to the carrier cannot be guaranteed.

In a further advantageous development of the process according to the invention, data are entered which define a printing master to be created consisting of at least one pattern. Patterns stored in memory are assigned and positioned on the printing master according to the data which define the printing master to be created. If a pattern is not stored, a new pattern is designed and stored. Then, the drawing data describing the printing master are output, and a prefixed toner image according to the drawing data is created on the carrier sheet.

An arrangement according to a further advantageous development of the invention has, in addition, among other things, an input device to enter data and a drafting device to design a pattern. The data entered via the input device define a printing master to be created, consisting of at least one pattern. Stored patterns are allocated by a data management device and positioned on the printing master according to the data which define the printing master to be created. Here, in the case of a pattern which is not stored, the data management device calls up an appropriate pattern design from the designing device and then stores the newly designed pattern. An output device sends the drawing data describing the printing master to the printer, which creates, on the carrier sheet, a toner image corresponding to the drawing data.

In this fashion, in addition to the above-described advantages, it is possible to cost-effectively individually design and decentrally create dials using already existing equipment. Modification of an already existing printing master is readily possible by loading the pattern from the data management device and processing it with the designing device. Furthermore, it is possible to produce dials, for example, with nonlinear scales or with multiple divisions simply, even in small runs. With the additional use of an electronic scanner, digitally scanned images such as graphics consisting of individual image elements can also be incorporated into the design of the printing master of a dial.

According to another advantageous embodiment of the invention, a press consists of a flat press which has a lower portion to accommodate the blank. Using this device, which is particularly suited for the production of dials in small runs, it is possible to obtain very accurate alignment of the blank and the carrier sheet in the flat press, such that high quality of the dial is guaranteed.

Exact positioning and securing of the blank in the press and of the carrier sheet on the blank or in the press is of extreme significance in obtaining a properly positioned and aligned imprint on the blank, which forms a support plate. When, as in the prior art process, there is no exact positioning of the object to be imprinted, the accuracy of the coverage of the printed image and the object to be imprinted depends on alignment by an operator. In contrast, it is possible according to the invention to prevent misalignment of the dial imprint relative to the support plate through the accurate positioning of the blank and the carrier sheet relative to the press by means of the alignment device. In addition, both the blank and the carrier sheet are secured during the transfer of the toner to the blank as described in the following, such that a shifting of the respective blank and carrier sheet relative to each other cannot occur during the transfer.

According to a second exemplary embodiment of the invention, the press is composed of at least one pair of press rollers disposed opposite each other. The blank with the toner image aligned on it is introduced on a retaining plate into a gap formed between the two press rollers, whereby the retaining plate is engaged by the rotating rollers and pulled into the gap.

By means of the press rollers, the toner image, mirror-inverted relative to the imprint, is softened. The subsequent pressing causes the toner image to be transferred from the carrier sheet to the blank. This design is particularly appropriate for use in automated production since manual intervention can be largely eliminated. The toner image can be advantageously fed to the press rollers from an endless carrier sheet roller. Thus, the speed of production of dials is increased relative to the first exemplary embodiment such that the production yields and thus the cost-effectiveness of production are increased.

According to a third exemplary embodiment of the invention, the press is composed of a lower part to accommodate the blank and at least one press roller disposed opposite the lower part. The lower part of this press may, for example, be designed like the lower part of the flat press according to the first exemplary embodiment. Like the second exemplary embodiment, the third exemplary embodiment is also particularly suited to automated mass production of dials, since in this case as well, the use of the press rollers yields a high production speed. Just as with the second exemplary embodiment, a very fine control of pressure and, consequently, its uniform distribution, are also possible with the third exemplary embodiment since linear application of pressure is possible with the press rollers instead of the area pressure generated by the flat press. However, since only one press roller is needed, the third exemplary embodiment is further distinguished by a particularly compact and space-saving design.

According to another preferred embodiment of the invention, the device has an arrangement for heat treatment of the printed dial Here, the dial is exposed for a predefined period of time to an elevated temperature. During this heat treatment, the surface of the dial provided with the imprint is uncovered. Thus, the imprint is burned into the surface of the blank forming the support plate such that the adhesion of the toner to the surface of the support plate is optimized and, moreover, the quality of the dial surface is improved. In particular, by means of this heating treatment following the production process, a very high resistance of the dial both to filling media present in the meter and to external environmental influences is obtained. Consequently, this embodiment of the invention is particularly appropriate for contact measuring devices.

Additional advantageous embodiments of the invention are reported in the remaining subordinate claims.

Figure 2:
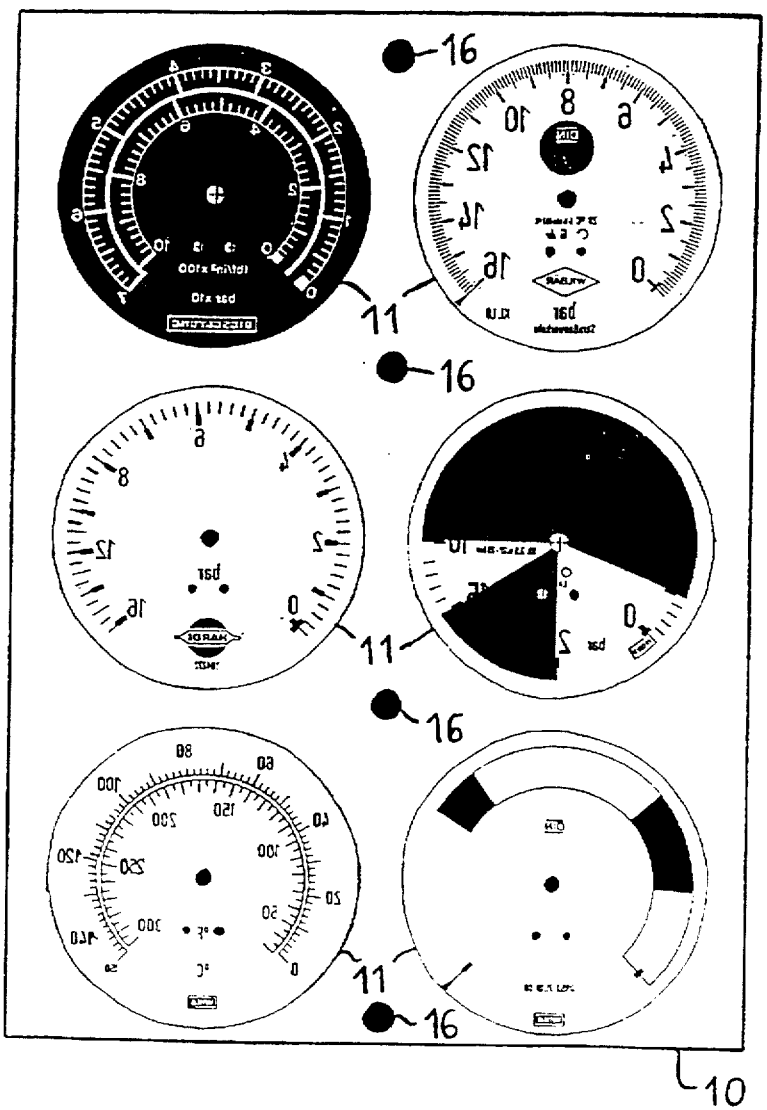
Figure 3:
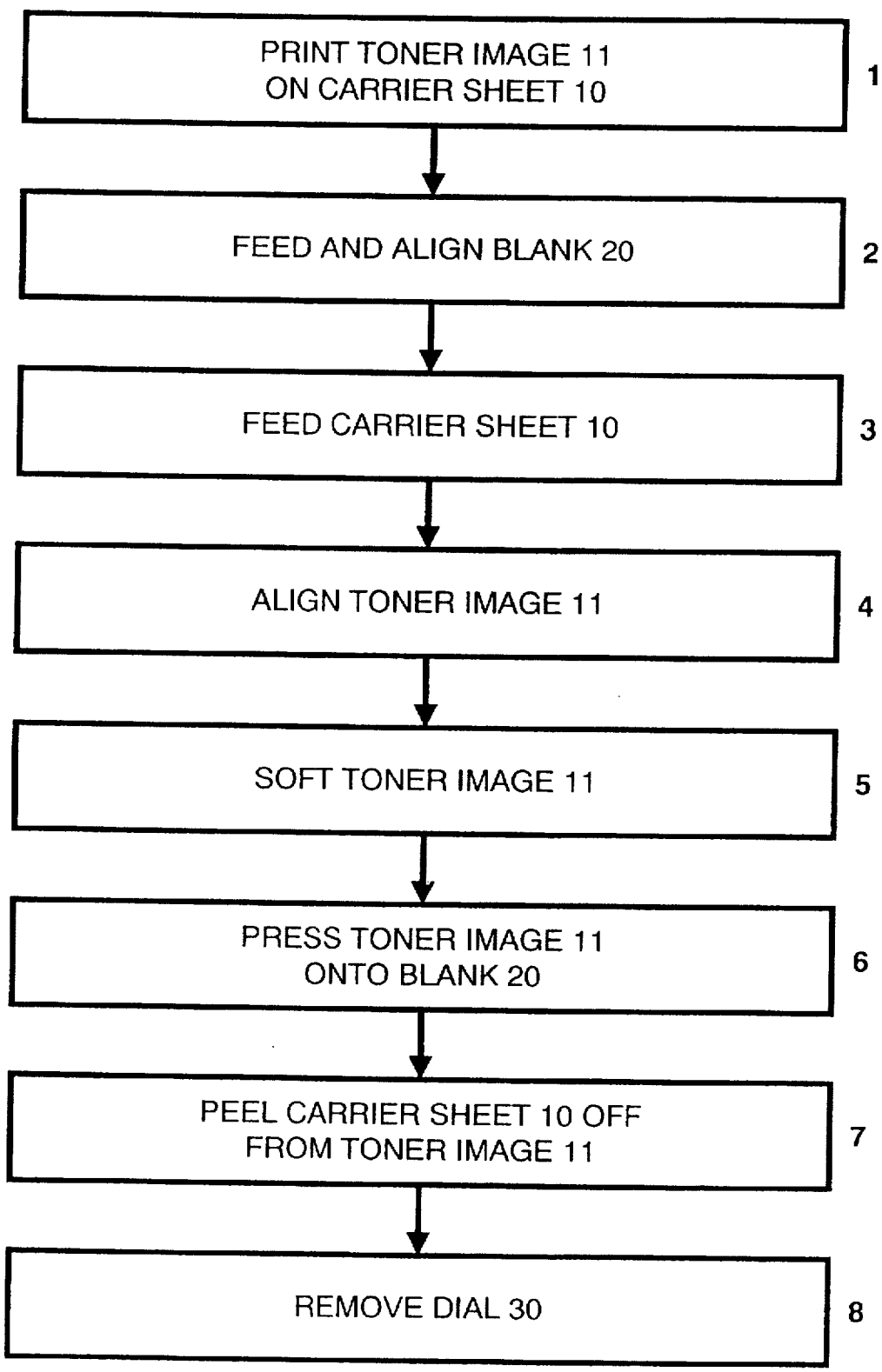
Figure 4:
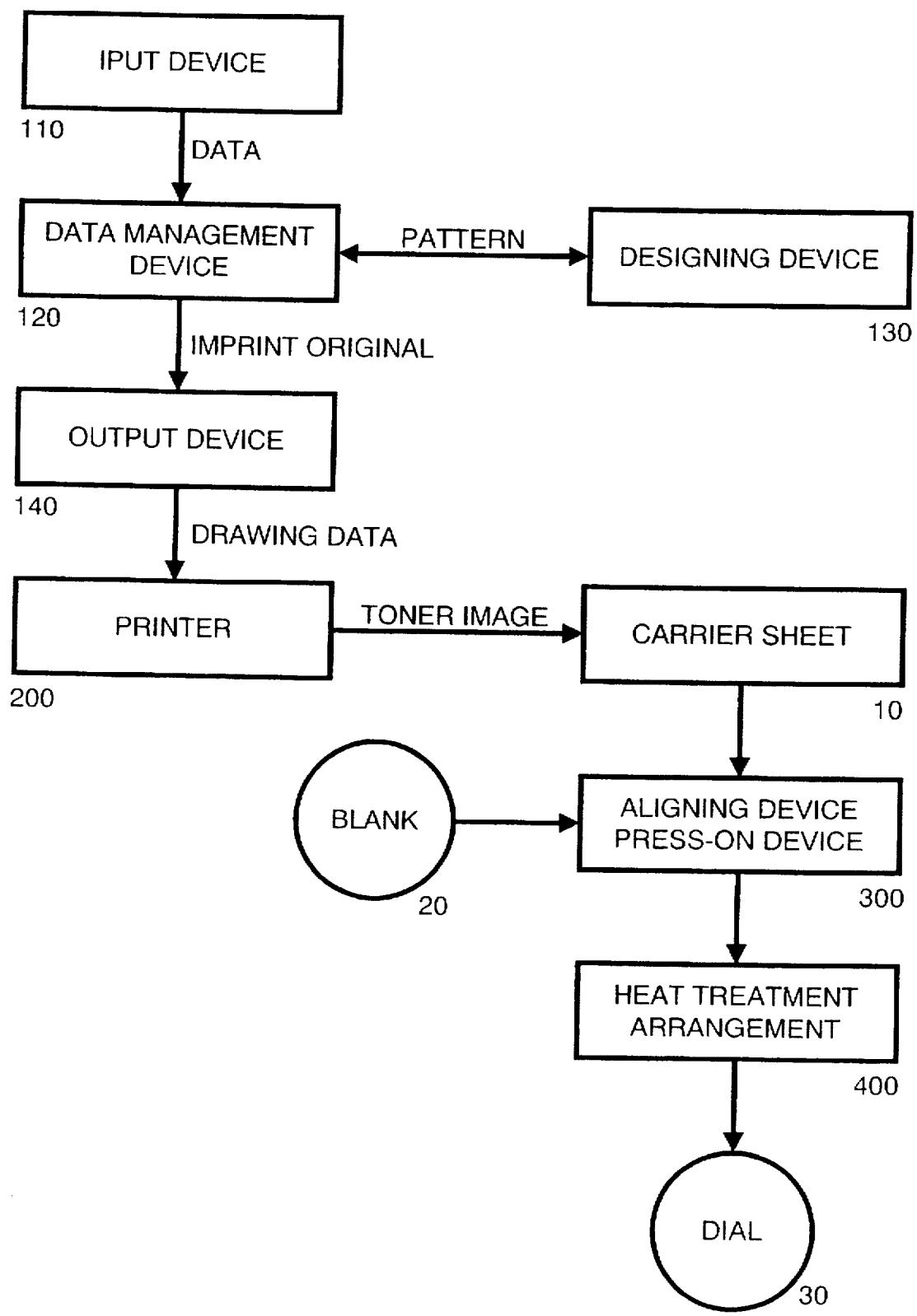
Figure 5A:
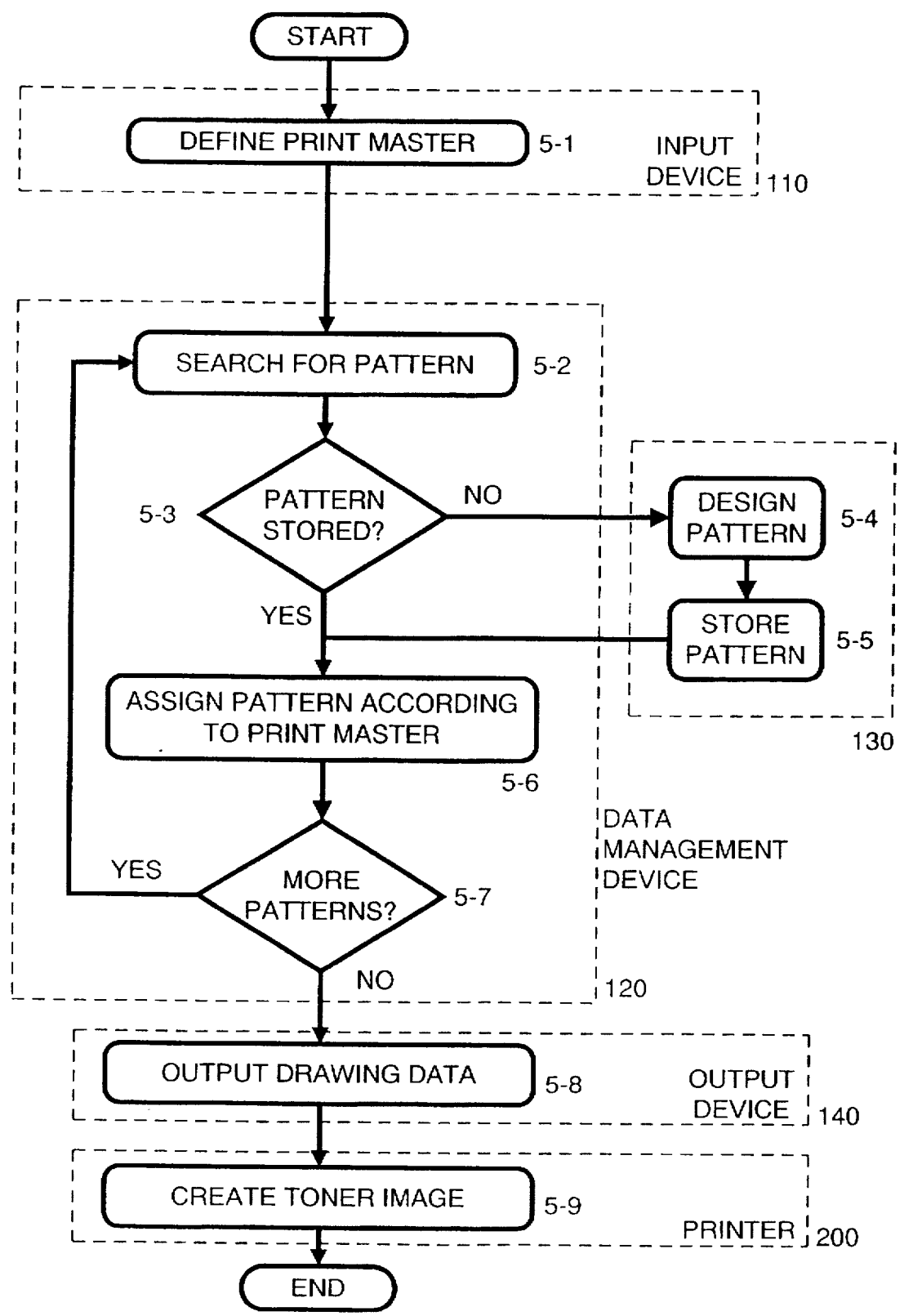
Figures 1, 5B:
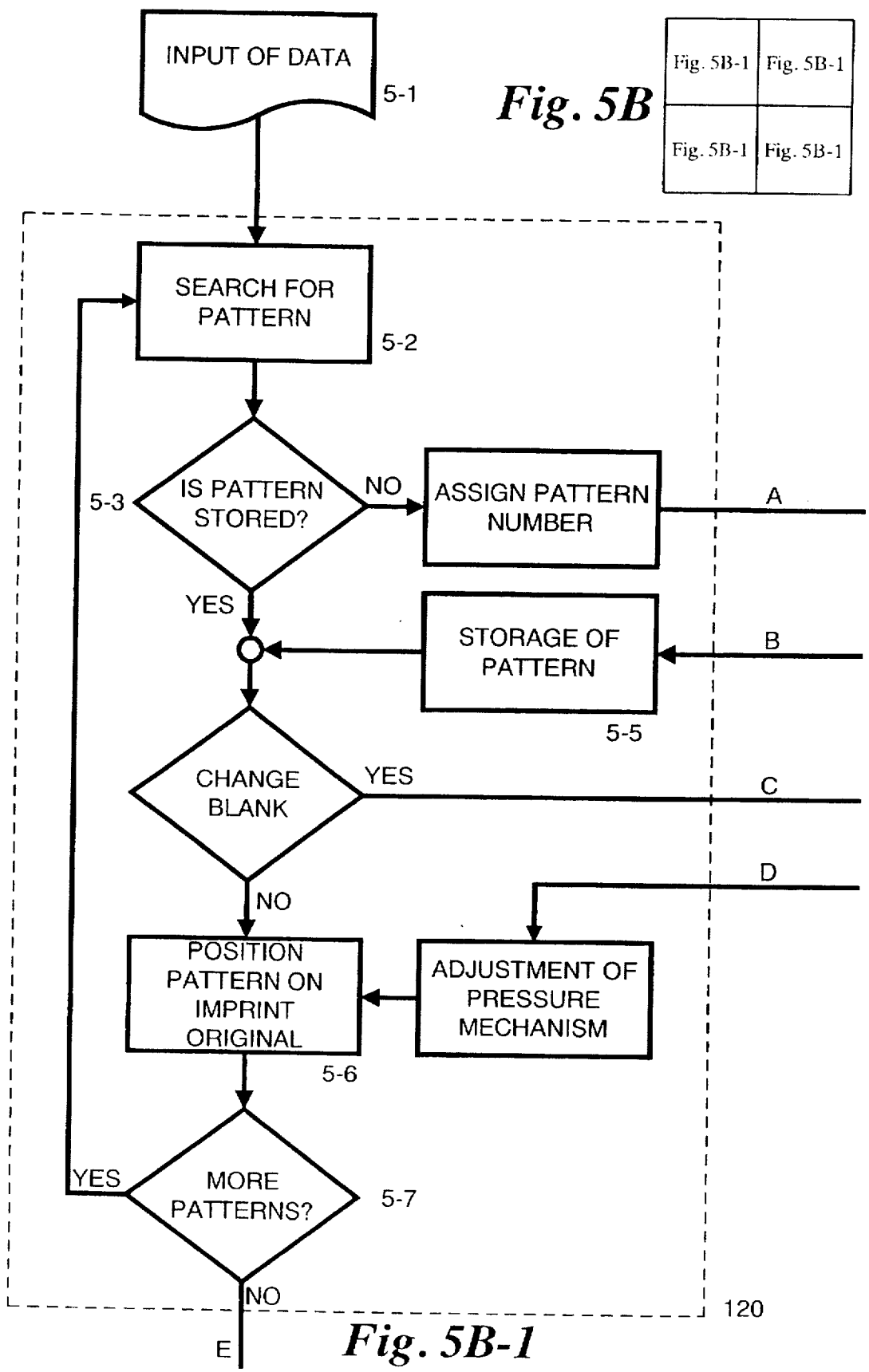
Figures 2, 5B:
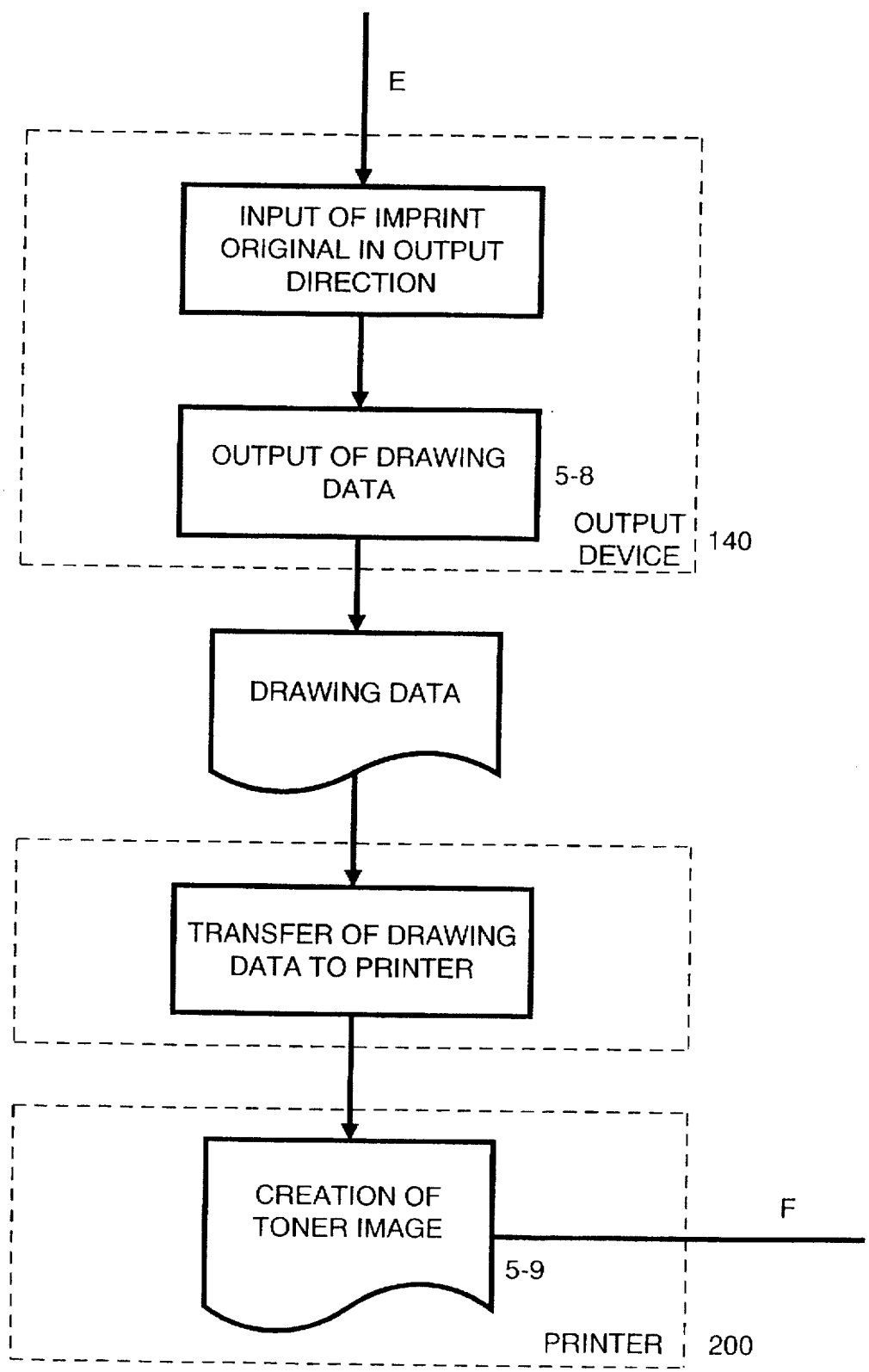
Figure 5B:
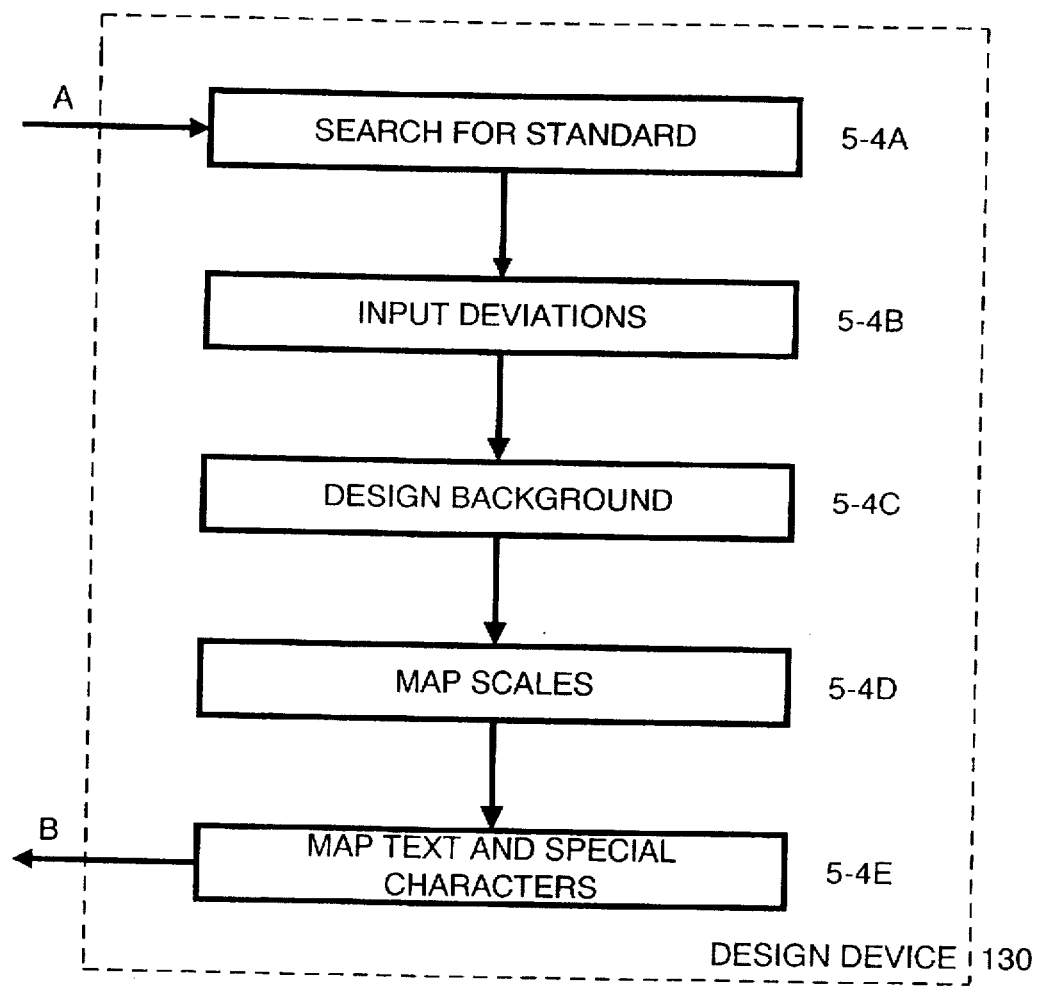
Figure 3:
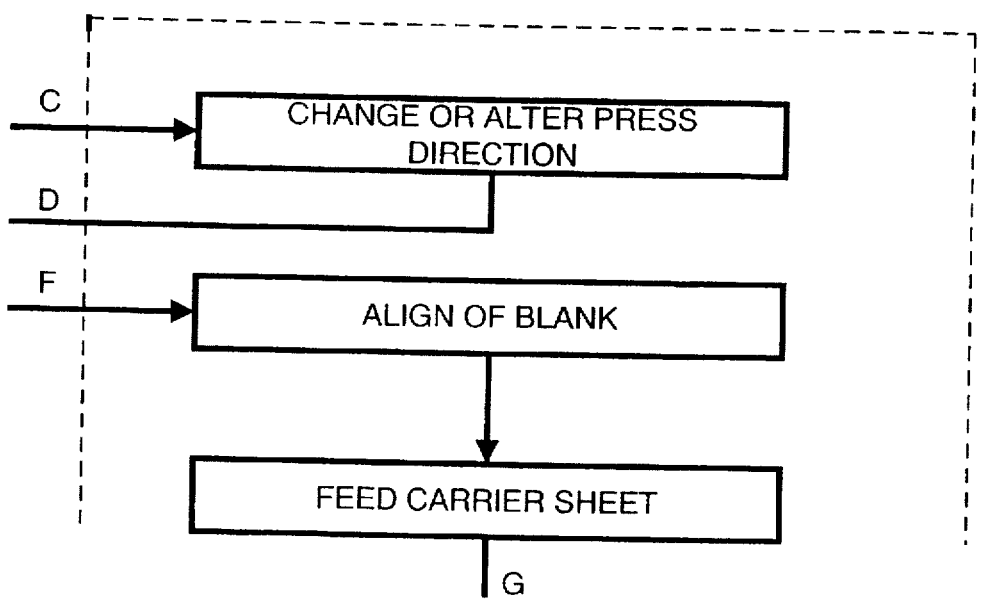
Figures 4, 5B:
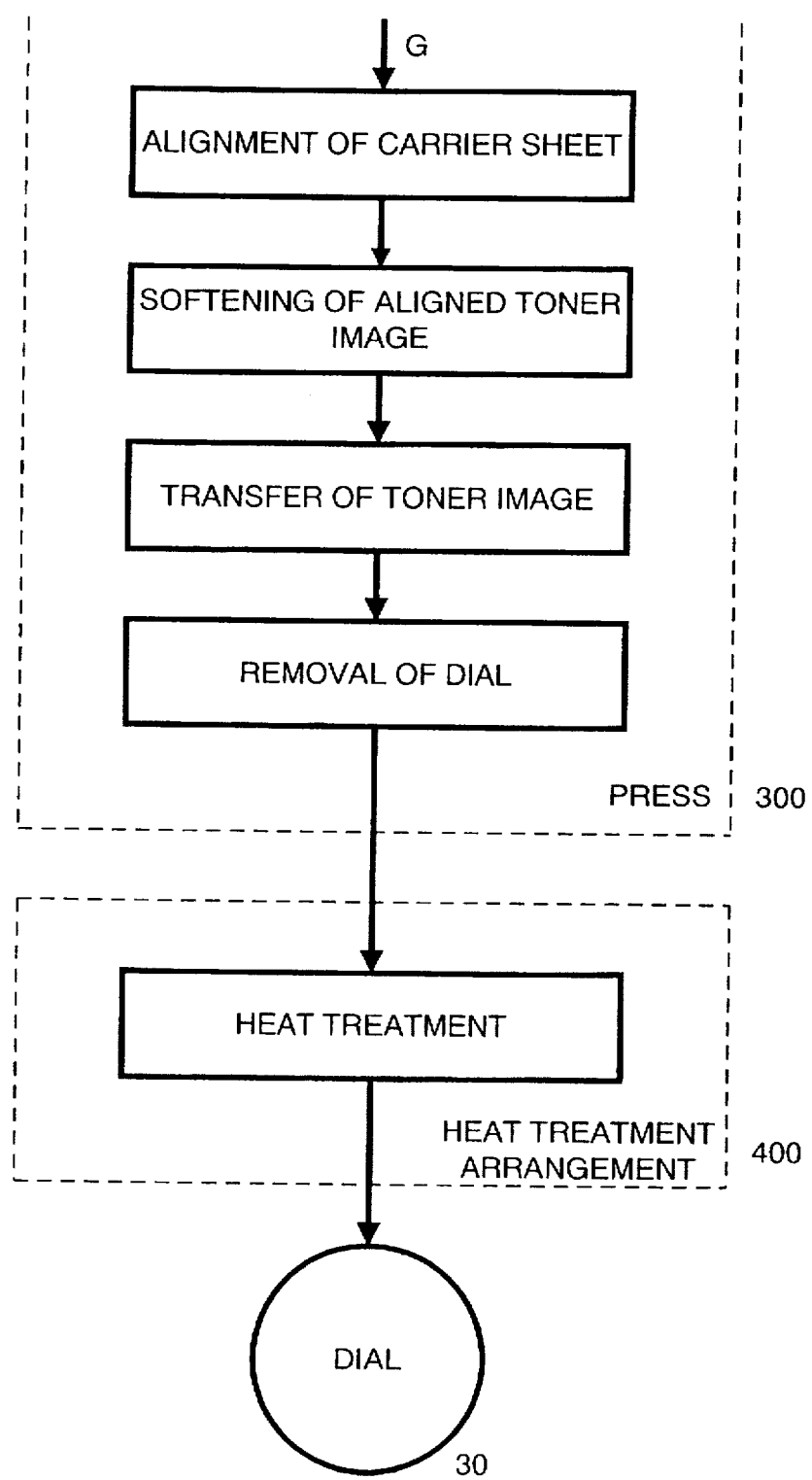
Figure 6:
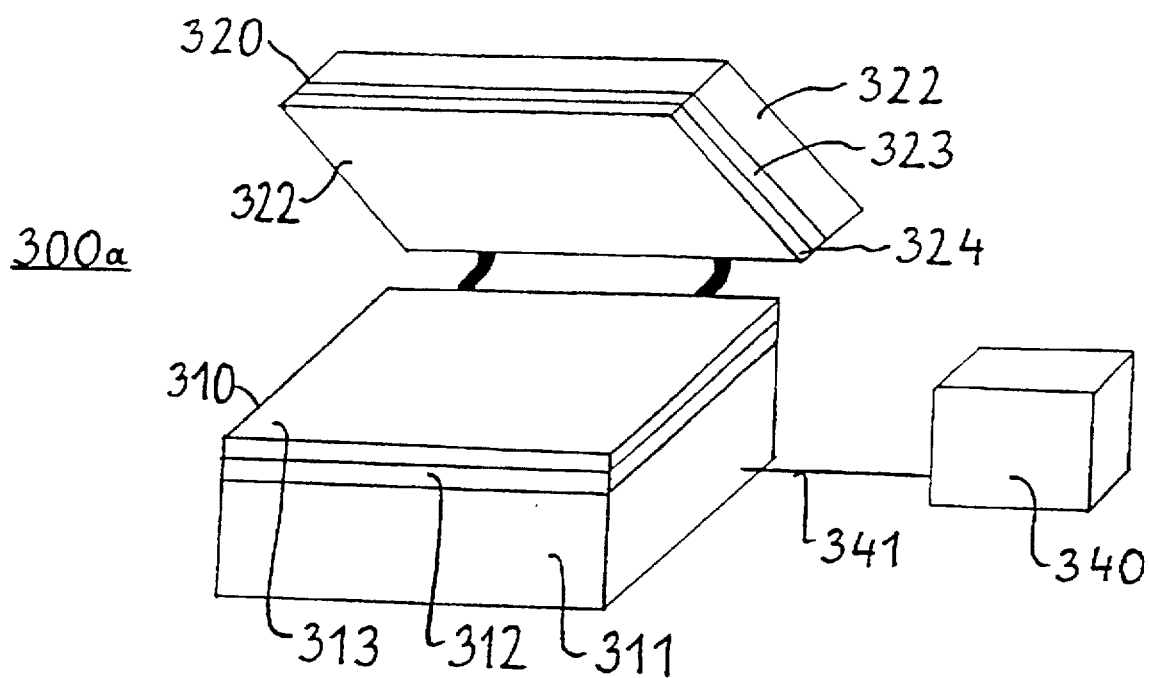
Figure 7:
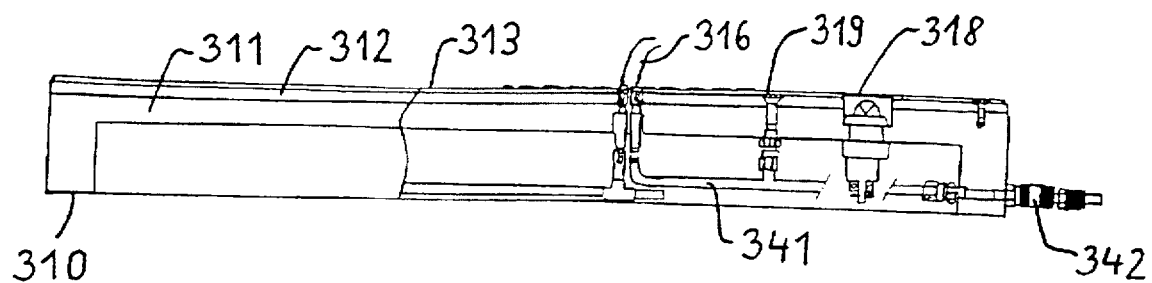
Figure 8:
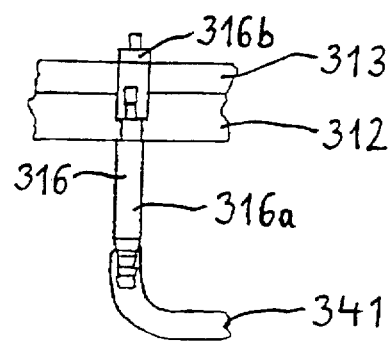
Figure 9:
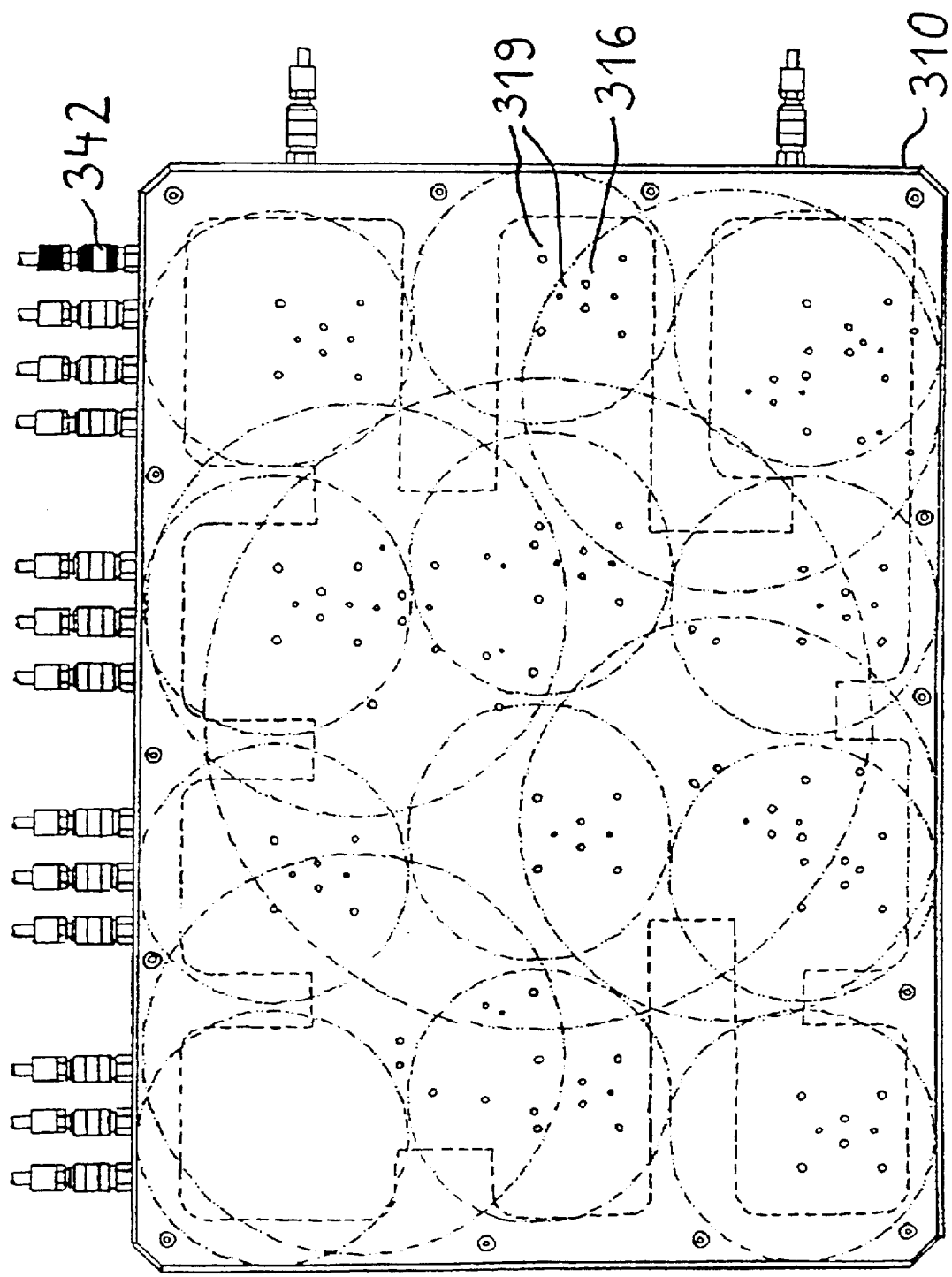
Figure 10:
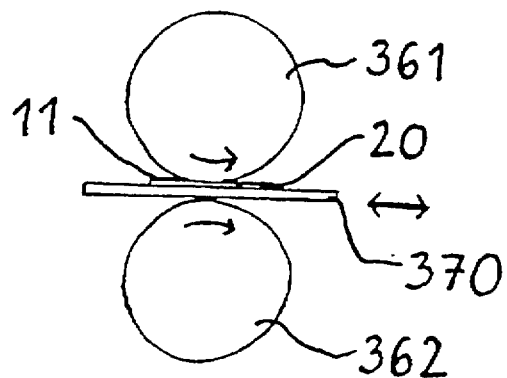
Figure 11:
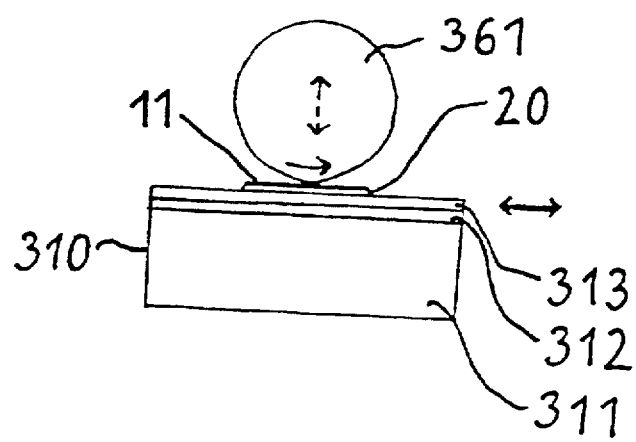

The invention is described in detail using exemplary embodiments with reference to the drawings. They depict:

FIG. 1 a top plan view of a dial produced by means of the process according to the invention, FIG. 2 a top plan view of a support plate with a plurality of different examples of prefixed toner images, FIG. 3 an exemplary flow chart of the process sequence, FIG. 4 an exemplary overall configuration of the device according to the invention consisting of a plurality of functional units, FIG. 5 an exemplary flow chart for creation of a toner image, whereby FIG. 5A depicts a general overview of the process for creation of a toner image and FIG. 5B depicts, in detail, the entire process according to the invention for production of a dial, FIG. 6 a schematic perspective of a press in the form of a flat press according to one exemplary embodiment, FIG. 7 a longitudinal section through an example for a lower part of the flat press, FIG. 8 a longitudinal section through an example for a guide pin which can be accommodated in a hole provided in the lower part of the flat press, FIG. 9 an exemplary top plan view of a lower part of the flat press depicted in FIG. 6, FIG. 10 a longitudinal section through a press according to another exemplary embodiment, and FIG. 11 a longitudinal section through a press according to another exemplary embodiment.

A dial 30, like that depicted by way of example in FIG. 1, may be produced by means of the process and the device according to the invention. The dial 30 has a support plate and an imprint 12, which is composed of a transferred toner image, applied on one of the two surfaces of the support plate. The support plate, which is covered by the imprint 12 in FIG. 1, is made up of a blank and can be produced, for example, from a plastic or a metal, such as, preferably, from a stamped metal plate. The imprint 12 comprises an annular scale 13 applied to a background, which scale runs along the edge of the circular imprint 12 and is produced in a different color from the background. The scale 13 is composed of markings in the form of scale marks 14 and some dimensional numbers associated with the scale marks 14. In addition, the imprint 12 is provided with further data, i.e., the unit symbols "°C" or "°F", as well as a manufacturer mark below it. The dial 30 also has in its center a hole 21 which passes through it to accommodate a pointer shaft and two holes 22 disposed below the hole 21 which also pass through the dial 30.

The above-described dial produced by means of the process according to the invention can, in principle, be used in all types of meters for measurement of any variables. Although the dial depicted as an example is intended for a thermometer, dials produced in such a manner are also particularly suited for use in pressure gages.

A circular dial 30 and a circular imprint 12, respectively, were described above. The imprint 12 may, however, have not only different diameters but also, for example, a rectangular shape and a shape with asymmetric outlines. Furthermore, the imprint is not restricted to the above-described design but may instead be laid out according to FIG. 2, which depicts a carrier sheet 10 with six different examples of prefixed toner images 11, which are mirror inverted relative to their respective imprints. The carrier sheet 10 may be made, for example, from paper or film. Furthermore, for alignment of the carrier sheet 10 in a press the carrier sheet 10 is provided with a plurality of perforations 16 which accommodate guide pins provided on the press.

The toner images 11 disposed on the carrier sheet 10 may all be designed alike, or, as depicted in FIG. 2, they may be different. Of course, it is possible to have any other number of toner images appropriately disposed on the carrier sheet 10, instead of the above-described six toner images 11. Moreover, instead of the perforations 16 for alignment in the press, the carrier sheet 10 may have cross hairs which are applied during creation of the toner image 11 along with it on the carrier sheet 10. Using these cross hairs, the alignment of the carrier sheet 10 in the press can be performed optically.

FIG. 3 depicts the general sequence of the process according to the invention for the production of a dial by printing a blank with an imprint. First, a printing master, which is introduced into a printer, is created. In a step 1 according to FIG. 3, the printer creates, on a carrier sheet 10, a prefixed toner image, mirror-inverted relative to the imprint and corresponding to the printing master. In a step 2, the blank 20 which is to be imprinted, consisting, for example, of a sheet with a circular cross-section, is introduced into a press and aligned in a predefined position by means of an alignment arrangement. After that, in a step 3, the carrier sheet 10 is introduced into the press and the toner image 11 laid on the blank 20. The toner image 11 is aligned by means of an alignment arrangement in a predefined position which corresponds to the predefined position of the blank 20. In the following, various processes and devices for the alignment of the blank 20 and the toner image 11 will be treated in detail. The toner image 11 is softened in a step 5 and pressed onto the blank 20 in a step 6 by exertion a force perpendicular to the plane of the carrier sheet 10 and the blank 20. The toner image 11 is transferred from the surface of the carrier sheet 10 to the surface of the blank 20 and adheres to it since the toner image 11 preferably adheres to the surface of the blank 20 compared to the carrier sheet 10. And finally, in a step 7, the carrier sheet 10 is peeled off the transferred toner image 11, and in a step 8, the dial 30 is removed from the press. For the introduction of the blank 20 and of the carrier sheet 10 as well as for the removal of the dial 30, the press can be movable in at least one direction perpendicular to the plane of the carrier sheet 10 and of the blank 20.

In the following, referring to FIG. 4 and 5, by way of example, the creation of the toner image is described in detail. FIG. 4 depicts an exemplary configuration of the device according to the invention made up of a plurality of functional units. FIG. 5A depicts a flow chart which presents the essential steps of the creation of the toner image 11 on the carrier sheet 10, while all steps of the entire process for production of the dial may be seen in FIG. 5B.

First, in a step 5-1 according to FIG. 5, data which define a printing master to be created are entered by means of a data entry device. The printing master consists of at least one pattern for a toner image. Based on the data, a data management device 120, in a step 5-2, performs a search for a specific pattern. In a step 5-3, a decision is made as to whether the specific pattern is stored. If the pattern is not stored, a pattern number is assigned according to 5B and the system then branches to a step 5-4, in which, by means of a designing device 130, a pattern is newly designed. In this process, in detail, in one step 5-4a a search for a standard on the basis of which a pattern should be designed is performed. In a step 5-4b, the deviations of the pattern to be designed relative to the standard are entered. After the background of the dial design has been designed (step 5-4c), one or a plurality of scales are mapped on the dial design in a step 5-4d. Upon conclusion of the pattern design, in a step 5-4e, text and special characters are accepted into the pattern design and mapped such that the pattern design can be stored in a step 5-5. Using the designing device 130, it is even possible to introduce a graphic into the printing master. In this case, by using, for example, a digital sensing device such as a scanner, a desired graphic is scanned and introduced into the printing master for creation of the toner image. According to FIG. 5B, a check is then performed to determine whether a blank 20 present in the press 300 should be exchanged. If so, the press 300 is appropriately changed and set. The already stored or newly designed pattern is allocated in a step 5-6 by the data management device 120 and positioned on the printing master. In a step 5-7, a check is performed to determine whether additional patterns which are to be placed on the printing master are present. If so, the system branches back to step 5-2 to search for the appropriate pattern. Next, the above-described steps 5-3 through 5-6 are repeated for the following pattern. If, however, no additional patterns which must be placed on the printing master are present, the printing master is entered in an output device 140 which, in a step 5-8, outputs the drawing data describing the printing master as a file. The drawing data which may be archived in a page description language such as "Postscript" (registered trademark of Adobe Systems, Inc.) are transmitted to the printer 200 to create a toner image. The printer 200 may be, for example, a laser printer, an ink jet printer, or a copier which can create black-and-white and/or color printouts. The printer 200 creates, in a step 5-9, at least one prefixed toner image 11, image-inverted relative to the imprint, corresponding to the printing master or to the drawing data describing it.

With the exception of the optional heat treatment, the additional steps of the process for production of a dial depicted in FIG. 5B correspond to the steps 2 through 8 already described in conjunction with FIG. 3 such that their description here is omitted.

It is also possible that a toner image is created not as in FIG. 5A, but manually, for example, whereby the printing master is applied to a carrier such as a sheet of paper or a film. In this case, a copier 200 creates the toner image 11 corresponding to the printing master which is fed to the copier 200.

It should be noted that in FIG. 4, the devices of the arrangement according to the invention are depicted by blocks with bold outlines whereas parts of the figure with light outlines represent intermediate or end products of the process according to the invention. Blocks outlined in broken lines depict optional devices of the arrangement according to the invention.

FIG. 6 depicts a schematic perspective of a press according to a first exemplary embodiment, which press is designed as a flat press 300a. The flat press 300a is depicted in an open state. As may be seen from FIG. 6, the flat press 300a consists of a lower part 310 and a upper part 320 which may be placed on the lower part 310, which part 320 may be pivotably attached to the lower part 310 by hinges, for example. The separation of the upper part 320 from the lower part 310 of the flat press 300a possible either by pivoting the upper part 320 or the lower part 310 or even by a translational movement such as the lifting of the upper part 320 from the lower part 310. The lower part 310 has a base plate 311 for installation of the lower part 310 on a base, made, for example, of aluminum. The base plate 311 is covered with a damping layer 312 such as a rubber mat which serves to even out unevenness of the base plate 311 and thus for uniform transfer of the toner to the blank 20. The damping layer 312 is in turn covered by a bottom separation layer 313, which also evens out unevenness of the base plate 311. Through the placement of the damping layer 312 and the bottom separation layer 313 on the base plate 311, it is possible to even out the transmission of heat and pressure such that an increase in the print quality of the dial is obtained. The bottom separation layer 313 is made, for example, of polytetrafluoroethylene (PTFE, trade name: Teflon) and is also used for thermal insulation. The bottom separation layer 313, the damping layer 312, and the base plate 311 are provided with holes into which the guide pins provided on the base plate 311 are inserted. For alignment of the blank 20 introduced into the flat press 300a in a predefined position, the guide pins engage in the holes 21 passing through the blank 20. The guide pins can be retracted into the lower part 310 of the flat press 300a and, in their engaged position are perpendicular to the primary plane of the blank 20 and the carrier sheet 10 under spring tension. For this, the guide pins are preloaded for accommodation in the lower part 310 of the flat press 300a by means of springs (not shown). The selection of the preloading tension depends on whether the spring tension is used to compensate for overpressure or a vacuum. This is explained in detail in the following. The guide pins may also be pneumatically loaded in the direction of their engaged position instead of using springs.

According to one embodiment of the invention, some of the guide pins may also be used to align the carrier sheet 10, which is placed on top of the blank 20. For this, these guide pins engage through the holes 22 of the blank 20 in the perforations 16 of the carrier sheet 10. Thus, it is possible to obtain highly accurate positioning of both the carrier sheet 10 and the blank 20 in the flat press 300a.

The guide pins may be moved out of the holes during alignment of the blank 20 by means of an overpressure, which is generated in a line connected to the holes of the guide pins and hereinafter referred to as the pressure line 341, against the spring force of the aforementioned springs. In this case, the springs are preloaded in the direction from the upper part 320 to the lower part 310 of the flat press 300a considered as a closed press. For this, the pressure line 341 is connected to a pressure generator 340 which generates the overpressure. In addition, the bottom separation layer is provided with additional holes as suction holes which are also connected via the pressure line 341 to the pressure generator 340. By means of these suction holes, the aligned blank 20 is drawn by a vacuum against the bottom separation layer 313 and thus retained in the predefined position on the lower part 310 of the flat press 300a. Then, the carrier sheet 10 with the toner image 11 and at least two perforations 16 is introduced into the flat press 300a, such that the guide pins of the lower part 310 of the flat press 300a in the corresponding perforations 16 of the carrier sheet 10 such that the carrier sheet 10 with the toner images 11 is aligned in a position corresponding to the predefined position of the blank 20.

The upper part 320 of the flat press 300a has a heating plate 322, which converts electrical energy supplied from the outside into thermal energy and is used to heat the carrier sheet 10. In addition, a equalization layer 324 such as an overlay made of a cotton fabric is provided to cover the aligned carrier sheet 10, which evens out the unevenness of the carrier sheet 10 and of the blank 20 and thus equalizes the pressure between the upper part 320 and the lower part 310 of the flat press 300a. Simultaneously, the temperature between the upper part 320 and the lower part 310 is equalized since, for example, entrapped air preventing the temperature transfer is thus eliminated. Thus, the quality of the printed dial is further improved. Furthermore, the equalization layer 324 absorbs liquids and vapors resulting from the heating of the carrier sheet 10 and thus guarantees constant print quality. A top separation layer 323 which prevents adhesion of the equalization layer 324 to the heating plate 322 is also provided between the heating plate 322 and the equalization layer 324. Like the bottom separation layer 313 of the lower part 310 of the flat press 300a, the top separation layer 323 may also be made of polytetrafluoroethylene (PTFE).

To close the flat press 300a, the upper part 320 is placed on the lower part 310. Then, a force is exerted perpendicular to the plane of the carrier sheet 10 and the blank 20 to press the carrier sheet 10 against the blank 20, which may, for example, be the force of the actual weight of the upper part 320 of the flat press 300a. Simultaneously, the heating plate 322 is supplied with electrical energy for a predefined period of time such that the carrier sheet 10 is heated by the heating plate 322 and the toner image 11 is thus softened on the carrier sheet 10. Advantageously, the temperature for softening the toner image 11 is 100° C. for a period of 30 s. Through the pressing of the toner image 11 onto the blank 20, the toner image 11 is transferred to the blank 20 and fixed on it such that the carrier sheet 10 may be peeled off the transferred toner image 11 and the dial may be removed from the flat press 300a.

Instead of holes for the guide pins for alignment of the blank 20 in the predefined position, it is possible for the bottom separation layer 313 to also have recesses in which the blanks to be printed are aligned against a stop. This is particularly advantageous for blanks with asymmetric outlines. Obviously, a combination of such recesses with the above-described guide pins is possible for the alignment of the blanks and carrier sheets in the press and particularly logical when especially high positioning accuracy is desired.

Moreover, the carrier sheet 10 may be provided with at least one set of cross hairs instead of the perforations 16, which cross hairs are applied to the carrier sheet 10 along with the toner image 11 when it is created. In this case, the bottom separation layer 313 is also provided with at least one set of cross hairs which is illuminated by an appropriate lamp (not shown in FIG. 6) provided under the bottom separation layer 313 in the lower part 310 of the flat press 300a. During alignment of the carrier sheet 10 or the toner image 11 on the blank 20 in the predefined position, the cross hairs provided on the carrier sheet 10 and the cross hairs provided on the bottom separation layer 313 are juxtaposed. This alignment by means of cross hairs may take place both manually and with the use of an appropriate optoelectronic control unit, which has, for example, a plurality of light-emitting diodes and phototransistors for detection of the cross hairs applied on the bottom separation layer 313 and on the carrier sheet 10, evaluation electronics, and a display unit. The evaluation electronics processes signals which are emitted by the phototransistors positioned opposite the light-emitting diodes, and sends appropriate signals for display to the display unit which informs an operator, for example, optically or acoustically of the alignment of the carrier sheet 10 relative to the bottom separation layer 313.

Alternatively, the guide pins may also be retracted after alignment of the blank 20 and the carrier sheet 10 in the predefined position by means of a vacuum generated in the lower part of the flat press 300a by the pressure generator 340 or by means of electromagnets. Since the retraction of the guide pins into the lower part 310 of the flat press 300a takes place against the spring tension of the aforementioned springs, the guide pins are in this case preloaded to protrude from the lower part 310.

It should be noted that for the purposes of clarity of the drawing in FIG. 6 both the thickness of the layers 312 and 313 and that of the layers 323 and 324 are not drawn to scale.

FIG. 7 depicts a longitudinal section through an example of the lower part 310 of the flat press 300a. In FIG. 7 parts identical or corresponding to those depicted in FIG. 6 are provided with the same reference numbers. The aforementioned bottom separation layer 313 and the damping layer 312 are attached by screws to the base plate 311. The lower part 310 has at least two guide pins 316 for each blank 20 to be aligned, which pins may be introduced into the corresponding holes 22 provided in the blank 20. The two guide pins 316 are provided in holes which pass through both the base plate 311 and the layers 312, 313. These holes are connected to the pressure line 341, which is in turn connected by pressure connections 342 to the pressure generator 340 (not shown in FIG. 7). By means of the pressure line 341, the guide pins 316 can be selectively either retracted after successful alignment of the blank 20 on the lower part 310 by a vacuum or extended before the alignment of the blank 20 by an overpressure. Moreover, at least one suction hole 319 for suction of the blank 20 and/or the carrier sheet 10 against the bottom separation layer 313 of the lower part 310. A lamp 318 is used to illuminate a set of cross hairs (not shown) on the surface of the bottom separation layer 313. For alignment of the carrier sheet 10 on the blank 20, either some of the guide pins 316 engage in corresponding perforations 16 provided on the carrier sheet 10, or alternatively, the cross hairs provided on the carrier sheet 10 are juxtaposed with the bottom-illuminated cross hairs on the surface of the bottom separation layer 313.

FIG. 8 depicts a longitudinal cross-section through an example of a guide pin 316, which is preloaded according to one embodiment to be accommodated in the lower part 310 of the flat press 300a. In FIG. 8, the guide pin 316 is depicted in a state moved out of the lower part 310 by means of an overpressure. The guide pin 316 is accommodated by a hole passing through both the bottom separation layer 312 and the damping layer 312. As mentioned above, the guide pin 316 is preloaded by means of a spring 316a in the lower part 310 of the flat press 300a the blank 20 and the carrier sheet 10 are pressed against each other after alignment. Before the removal of the dial 30 from the lower part 310 of the flat press 300a, the guide pin 316 is withdrawn by means of pressure supplied via the pressure line 341 against the spring action of the spring 316a. The guide pin 316 withdraws from the lower part 310 by means of a shoulder 316b which must be brought into engagement with the bottom surface of the blank 20 and the carrier sheet 10. This counteracts a possible adhesion of the dial 30 to the lower part 310 of the flat press 300a due to byproducts of the production process remaining between the bottom of the carrier plate or the dial 30 and the bottom separation layer 313. Moreover, the removal of the dial 30 from the flat press 300a is made easier, for example, by an automatic gripper. It is also possible that the guide pin 316 protrudes from the lower part 310 upon placement of the blank 20 and the carrier sheet 10 for their guidance such that the blank 20 may be laid on the shoulder 316b of the guide pin 316. Such guide pins are retracted into the lower part 310 of the flat press 300a before the closing of the flat press 300a for pressing by means of a vacuum against the spring action of the aforementioned springs.

A top plan view of an example of a lower part 310 of the flat press 300a depicted in FIG. 9. For reasons of clarity, in this depiction neither the lamps 318 nor the cross hairs are shown. As may be seen from FIG. 9, the lower part 310 may simultaneously accommodate, on the surface of the bottom separation layer 313, a large number of blanks of various shapes and sizes, which may then be aligned in the flat press 300a by means of the appropriate guide pins 316. The various possibilities for accommodation of blanks are depicted by dot-dash lines for blanks with a circular cross-section and with broken lines for blanks with an almost rectangular cross-section. Depending on the size of the blank to be accommodated, it must be sucked through the suction holes 319 with an appropriate diameter. Consequently, the suction holes 319 present on the surface of the bottom separation layer 313 have different diameters. The carrier sheet 10 may be sucked against the blank 20 after alignment in the flat press 300a either directly by means of a suction hole 319 provided in the lower part 310 or through the hole 21 passing through the blank 20 by a vacuum. In the latter case, the diameter of the hole in the lower part 310 may or should be larger than that in the blank 20. Alternatively, the blank 20 may be sucked against the bottom separation layer 313 by means of an additional hole provided in the lower part 310, which lies opposite a closed-surface section of the blank. The pressure connections to link the pressure line 341 with the pressure generator 340 are provided on the exterior walls of the lower part 310. By means of large number of pressure connections 342, all suction holes 319 can be controlled either individually or in groups by a control unit (not shown). Thus, blanks of different shapes and sizes or fewer blanks that the maximum number which can be accommodated by the flat press 300a can be simultaneously held by suction.

Instead of the flat press 300a depicted in FIG. 6, 7, and 9, according to a second exemplary embodiment of the invention, a roller press may be used to soften the toner image 11 and press the toner image 11 onto the blank 20.

FIG. 10 depicts a longitudinal cross-section through the roller press 300b according to a second exemplary embodiment of the invention. The roller press 300b is composed of at least one pair of pressure rollers 361, 362 disposed opposite each other, which rollers exert a force perpendicular to the plane of the carrier sheet 10 with the toner image 11 and the blank 20 and thus press the carrier sheet 10 against the blank 20. For the introduction of the carrier sheet 10 and the blank 20 into the roller press 300b and for the removal of the dial 30 from the roller press 300b, at least one of the press rollers 361, 362 may be movable perpendicular to the plane of the carrier sheet 10 and the blank 20.

After introduction of the carrier sheet 10 and the blank 20 into the roller press 300b, the toner image 11 and the blank 20 are aligned and secured in the predefined position on a retaining plate 370. According to this exemplary embodiment, the alignment and subsequent securing of the toner image 11 and the blank 20 may be carried out, for example, by means of an electrostatic charge. For this, preferably, the carrier sheet 10 and the retaining plate 370 made of an electrically conductive material are electrostatically charged to one polarity and the blank 20 to the opposite polarity, whereby the carrier sheet 10 adheres to the blank 20 and the blank 20 adheres securely to the retaining plate 370. The electrostatic charge may, for example, be achieved by means of charging brushes or charging blades provided in the roller press 300b.

After the toner image 11 and the blank 20 have been aligned on the retaining plate 370, the retaining plate 370 is introduced with the toner image 11 and the blank 20 into a gap between the press rollers 361, 362. Thus, a force is exerted perpendicular to the plane of the retaining plate 370, the carrier sheet 10, and the blank 20 by the press rollers 361, 362, whereby the toner image 11 is pressed against the blank 20. The retaining plate 370 is discharged to the side of the gap which is opposite the intake side, since the press rollers 361, 362 respectively rotate in different directions. As in the first exemplary embodiment, the carrier sheet 10 may be peeled from the transferred toner image 11 and the dial 30 may be removed from the roller press 300b, since after pressing, the toner image 11 adheres firmly to the support plate formed by the blank 20.

At least one of the press rollers 361, 362 of the roller press 300b may also be heatable. In this case, the retaining plate 370 is heated, along with the toner image 11 adhering to the blank 20, by the press rollers 361, 362, which convert externally supplied electrical energy into thermal energy. Through the heating the toner image 11 softens and is completely transferred to the blank 20. The finished printed dial 30 is discharged on the side of the roller press 300b opposite the intake side. Both the temperature and the rotational speed of the heatable press rollers 361, 362 are selected such that a complete transfer of the toner image 11 to the blank 20 is guaranteed.

Analogously to the first exemplary embodiment either one or both of the press rollers 362, 362 may be covered with an equalizing layer, for example, made of a cotton fabric to absorb liquids and vapors.

It is also possible to secure the toner image 11 and the blank 20 by applying a special adhesive between the toner image 11 and the blank 20, whereby the adhesive automatically releases when it is exposed to a specific temperature for a specific period of time.

Whereas according to the first exemplary embodiment of the invention, a surface pressure acts on the carrier sheet 10 and the blank 20, the press rollers 361, 362 of the roller press 300b according to the second exemplary embodiment of the invention exert a linear force. Thus, it is possible to more precisely control the distribution of force to press the carrier sheet 10 on the blank 20 and to make it more uniform, in order to further improve the print quality of the dial.

Since as described above the second exemplary embodiment is particularly appropriate for mass production of dials, the retaining plate 370 may advantageously be replaced by a conveyor belt which feeds the blanks and toner images continuously to the roller press 300b and again discharges the finished printed dials from the roller press 300b. In this case, the toner images are advantageously fed from an endless carrier sheet roller.

Although the alignment and the securing of the toner image 11 and the blank 20 by means of electrostatic charging and gluing have been described with reference to the second exemplary embodiment, these alignment and securing processes are in no way restricted to the roller press 300b according to the second exemplary embodiment, but may be equally used with the flat press 300a according to the first exemplary embodiment of the invention and with the third exemplary embodiment described in the following.

According to a third exemplary embodiment, the press is designed as a press depicted in FIG. 11 in longitudinal section and hereinafter referred to as combination press 300c, which has a lower part 310 and at least one press roller 361 disposed opposite the lower part 310. The lower part 310 of the combination press 300c may have the same or a similar structure as the lower part 310 of the flat press 300a according to the first exemplary embodiment. Consequently, in FIG. 11 components of the combination press 300c which correspond to those of the flat press 300a depicted simplified in FIG. 6 are provided with the same reference numbers such that here it is possible to dispense with a repeated description. As in the flat press 300a according to the first exemplary embodiment, the lower part 310 of the combination press 300c is connected via a pressure line to a pressure generator, both of which are, however, not shown in FIG. 11.

The press roller 361 may, like the press rollers 361, 362 of the roller press 300b according to the second exemplary embodiment, be movable in the directions indicated in this figure by a broken-lined double arrow perpendicular to the plane of the carrier sheet 10 and the blank 20. Thus, placement of blank 20 and carrier 10 on the lower part 310 of the combination press 300c and the removal of the printed dial 30 from it are possible. In the raised state of the press roller 361, both the blank 20 and the carrier sheet 10 are introduced into the combination press 300c and are aligned in the predefined position by means of any of the above-described alignment and securing processes. By lowering the press roller 361, as in the second exemplary embodiment, a force is exerted perpendicular to the plane of the carrier sheet 10 and the blank 20, whereby the toner image 11 is pressed and transfers from the carrier sheet 10 onto the blank 20. The press roller 361 may also by analogy with the press rollers 361, 362 of the roller press 300b according to the second exemplary embodiment be heatable for warming the carrier sheet 10 and the blank 20 and softening the toner image 11. After pressing the toner image 11 onto the blank 20, as in the above-described first and second exemplary embodiments, the carrier sheet 10 may be peeled from the transferred toner image 11 and the dial 30 may be removed from the combination press 300c.

Compared to the second exemplary embodiment, the third exemplary embodiment has the advantage that no retaining plate is required to accommodate the blank 20 and the carrier sheet 10 and only a single roller is required instead of the pair of rollers. Thus, in addition to the precise control and uniform distribution of the printing pressure also obtained according to the second exemplary embodiment, a particularly compact and thus space-saving design of the press is consequently possible.

The alignment of the blank 20 and of the toner image 11 in the predefined position may also be carried out by placement against an edge stop if the carrier sheet 10 is previously introduced into a cutting arrangement. Using electronic image processing, such a cutting arrangement detects the coordinates of the perforations 16 or cross hairs provided on the carrier sheet 10 and cuts off the outer edges of the carrier sheet 10 in a predefined relationship to the coordinates of the perforations 16 or cross hairs appropriately such that a fixed relationship between the toner image 11 and the edge to be brought into engagement with the edge stop is obtained.

Since the lower part 310 of the combination press 300c can execute a translational movement in the directions depicted by the solid-line double arrow parallel to the plane of the blank 20 and the carrier sheet 10, the transport of the carrier sheet 10 and of the blank 20 occurs according to this exemplary embodiment through the lower part 310. The softening of the toner image 11 may occur through heating as described above according to one of the first through the third exemplary embodiments. It is, however, also possible that the toner image 11 is softened chemically by the application of a solvent between the blank 20 and a carrier sheet 10', which may in this case have a different composition than the carrier sheet 10 used in the above-described exemplary embodiments. It is also possible that an appropriate solvent is applied on the back of the carrier sheet 10 after the carrier sheet 10' has been aligned on the blank 20, which solvent releases the toner image 11 from the carrier sheet 10'. Through subsequent pressing of the carrier sheet 10 onto the blank 20, the toner image 11 adheres as in the above-described embodiments of the invention to the support plate formed by the blank 20.

To increase the resistance of the printed dial 30 in general and in particular to filling media provided in the meter such as damping liquids, the dial 30 may be subjected to heat treatment after the step of removal from the press 300, i.e., step 8 according to FIG. 3. In this process, the softening of the toner image 11 and the pressing of the toner image 11 onto the blank 20 may occur according to one of the above-described first through third exemplary embodiments. Then, the dial 30 is introduced into a heat treatment arrangement 400 depicted in FIG. 4 in broken lines such as a warming cupboard or oven, in which it is exposed for a predetermined period of time to an elevated temperature. During the heat treatment, the surface of the dial 30 provided with the imprint is uncovered. Advantageously, the predefined period is one minute and the elevated temperature 150° C. To simplify the arrangement and to obtain a reduction in the investment costs, it is also possible to carry out the curing of the toner on the dial 30 by means of an infrared lamp.

Obviously, the processes according to the invention and the devices according to the invention may be used equally well in the production of both single-colored and multicolored dials. For this, in contrast to prior art processes, the number of colors is unlimited. All colors are also transferred simultaneously in one procedure.

A process and a device are described for production of a dial by imprinting a blank with an imprint which enable cost-effective production in very high quality even with small quantities. Data entered via an input device are delivered to a data management device, which positions the dial pattern on a printing master defined by the data entered. If a pattern is not stored in memory, a new pattern is requested from a design device and delivered to the data management device, which enters the printing master into an output device. The output device generates the printing master according to drawing data and outputs it to a printer which creates a prefixed toner image on a carrier sheet. The blank to be imprinted and the carrier sheet with the toner image mirror-inverted to the imprint are introduced into a press and the blank is aligned in a predefined position and the carrier sheet is aligned in a predefined position corresponding to the position of the blank. By softening the toner image and pressing the toner image onto the blank, the toner image is transferred from the carrier sheet to the blank and forms together with the blank a dial provided with the imprint. Then, the carrier sheet may be removed from the transferred toner image and the dial removed from the press. The press may be designed as a flat press, a roller press, or a combination of the two.

We claim:

1. A process for the production of a dial having a printed face comprising the steps of generating a prefixed toner image (11) on a carrier sheet (10), said toner image (11) comprising a mirror image of said printed face, introducing a blank (20) to be imprinted into a press (300) and aligning the blank (20) in a predefined position in the press, introducing the carrier sheet (10) into the press (300) for placement of the toner image (11) on the blank (20), aligning the carrier sheet (10) in a predefined position in the press corresponding to the position of the blank (20), softening the aligned toner image (11), pressing the softened toner image (11) onto the blank (20) to transfer the toner image (11) onto the blank (20) to form the printed dial face (12), peeling the carrier sheet (10) off the transferred toner image (11), and removing the dial (30) from the press (300).

2. The process according to claim 1, characterized by the additional steps of inputting data which defines a printing master to be created and which consists of at least one pattern, allocating and positioning stored patterns on the printing master according to the data defining the printing master to be created, whereby with a pattern which is not stored, an appropriate pattern design is requested and the newly designed pattern is stored, and output of the drawing data describing the printer master, whereby the prefixed toner image (11) to be created corresponds to the drawing data.

3. The process according to claim 2, characterized in that the drawing data are archived in a page description language.

4. The process according to claim 3, characterized in that the softening of the toner image (11) is effected by heating.

5. The process according to claim 4, characterized in that to soften the toner image (11), it is exposed for a period of 30 s to a temperature of 100° C.

6. The process according to claim 1, characterized in that the pressing of the toner image (11) onto the blank (20) takes place in a flat press (300a).

7. The process according to claim 6, characterized in that the aligned carrier sheet (10) is covered on its side away from the blank (20) with an equalization layer (324) to equalize the unevenness of the carrier sheet (10) and the blank (20).

8. The process according to claim 7, characterized in that the equalization layer (324) absorbs liquids and vapors.

9. The process according to claim 1, characterized in that the dial (30) is exposed for a predefined period of time to an elevated temperature, whereby the surface of the dial (30) provided with the imprint (12) is uncovered.

10. The process according to claim 9, characterized in that the predefined period of time is approx. one minute and the elevated temperature is approx. 150° C.

11. The process according to claim 1, characterized in that after alignment, the carrier sheet (10) is held on the blank (20) by a vacuum.

12. The process according to claim 6, characterized in that after alignment, the carrier sheet (10) is held in the flat press (300a) by a vacuum.

13. The process according to claim 1, characterized in that the softening of the aligned toner image (11) takes place chemically.

14. A device for production of a dial having a printed face, comprising a printer (200) to generate a prefixed toner image (11) on a carrier sheet (10), said toner image (11) being mirror-inverted relative to the imprint (12) to be produced on said face, an alignment device (316, 318, 319) for of positioning a blank (20) in a predefined position and for positioning a toner image on said carrier sheet (11) in a position which corresponds to the predefined position of the blank (20), and a press (300) to exert a force in a direction perpendicular to the plane of the carrier sheet (10) and the blank (20) and to press the toner image (11) from the carrier sheet onto the blank (20).

15. The device according to claim 14, characterized by an input device (110) for entry of data, which define a printing master to be created consisting of at least one pattern, a design device (130) for the design of a pattern, a data management device (120) for allocation and positioning of stored patterns on the printing master corresponding to data defining the printing master to be created, whereby for a pattern which is not stored the data management device (120) requests a corresponding pattern design from the design device (130) and stores the newly designed pattern, an output device (140) to output the drawing data describing the printing master to the printer (200), which generates the prefixed toner image (11) corresponding to the drawing data.

16. The device according to claim 15, characterized in that the drawing data are archived in a page description language.

17. The device according to claim 14, characterized in that the press (300) is heatable.

18. The device according to claim 14, characterized in that the press (300) is composed of a flat press (300a), which has a lower part (310) to accommodate the blank (20).

19. The device according to claim 18, characterized in that the lower part (310) of the flat press (300a) has, for each blank (20) to be aligned, at least two guide pins (316), which can engage in appropriate holes (22) passing through the blank (20).

20. The device according to claim 19, characterized in that the guide pins (316) are retractable into the lower part (310) of the flat press (300a) and are spring loaded in the direction of their engagement position.

21. The device according to claim 14, characterized in that the press (300) is composed of at least one pair of press rollers (361, 362) disposed opposite each other.

22. The device according to claim 14, characterized in that the press (300) is composed of a lower part (310) to accommodate the blank (20) and at least one press roller (361) disposed opposite the lower part (310).

23. The device according to claim 18, characterized in that the lower part (310) of the press (300) has a base plate (311) for installation of the lower part (310) on a base, a damping layer (312) covering the base plate (311), and a separation layer (313) covering, the damping layer (312), whereby the damping layer (312) and the separation layer (313) respectively equalize unevenness of the base plate (311).

24. The device according to claim 18, characterized in that the flat press (300a) has an upper part (320) which has a heating plate (322) to heat the carrier sheet (10), an equalization layer (324) to absorb liquids and vapors, and a separation layer (323) disposed between the heating plate (322) and the equalization layer (324), which prevents adhesion of the equalization layer (324) to the heating plate (322).

25. The device according claim 23 characterized in that the separation layer (313, 323) is thermally insulating and consists of polytetrafluoroethylene (PTFE).

26. The device according to claim 14, characterized by a device (400) for heat treatment of the dial (30).

* * * * *